(12) United States Patent
Shin

(10) Patent No.: US 7,101,268 B2
(45) Date of Patent: Sep. 5, 2006

(54) GRINDING TABLE FOR LIQUID CRYSTAL DISPLAY PANEL AND GRINDER APPARATUS USING THE SAME

(75) Inventor: Sang-Sun Shin, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 6 days.

(21) Appl. No.: 10/184,119

(22) Filed: Jun. 28, 2002

(65) Prior Publication Data

US 2003/0181149 A1 Sep. 25, 2003

(30) Foreign Application Priority Data

Mar. 20, 2002 (KR) ......................................... 2002-15127

(51) Int. Cl.
*B24B 9/00* (2006.01)

(52) U.S. Cl. .................. 451/242; 451/64; 451/258; 451/367; 451/412

(58) Field of Classification Search .................. 451/44, 451/64, 65, 177, 242, 244–246, 258, 364, 451/367, 379, 380, 411–414, 397; 269/133
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,640,501 A * | 2/1987 | Poland ......................... 269/21 |
| 4,653,864 A | 3/1987 | Baron et al. |
| 4,691,995 A | 9/1987 | Yamazaki et al. |
| 4,775,225 A | 10/1988 | Tsuboyama et al. |
| 5,028,182 A * | 7/1991 | Park ........................... 409/225 |
| 5,062,621 A * | 11/1991 | Mackey ....................... 269/305 |
| 5,247,377 A | 9/1993 | Omeis et al. |

FOREIGN PATENT DOCUMENTS

| | | | |
|---|---|---|---|
| EP | 589175 A1 * | 3/1994 | |
| EP | 1003066 A1 | 5/2000 | |
| EP | 1099510 A2 * | 5/2001 | |
| JP | 51-065656 | 6/1976 | |
| JP | 55048568 A * | 4/1980 | |
| JP | 57038414 | 3/1982 | |
| JP | 57088428 | 6/1982 | |
| JP | 58027126 | 2/1983 | |
| JP | 59-057221 | 4/1984 | |
| JP | 59-195222 | 11/1984 | |

(Continued)

*Primary Examiner*—David B. Thomas
(74) *Attorney, Agent, or Firm*—McKenna Long & Aldridge LLP

(57) ABSTRACT

Disclosed is a grinding table apparatus for a liquid crystal display panel and a grinder using the adapt to various sizes of unit liquid crystal display panels for grinding edges of the corresponding liquid crystal display panel by adjusting a variable moving distance of the grinding tables instead of replacing the previous grinding table. The present invention includes at least two grinding tables displaced in a direction making the grinding tables get farther from or closer to each other to adapt to the size of the unit liquid crystal display panel to grind edges of the unit liquid crystal display panel.

49 Claims, 8 Drawing Sheets

U.S. PATENT DOCUMENTS

| | | | |
|---|---|---|---|
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,816,986 A * | 10/1998 | Luecke et al. | 483/20 |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,306,015 B1 * | 10/2001 | Bushell | 451/44 |
| 6,337,730 B1 | 1/2002 | Ozaki et al. | |
| 6,349,929 B1 * | 2/2002 | Speltz et al. | 269/242 |
| 6,414,733 B1 | 7/2002 | Ishikawa et al. | |
| 6,702,268 B1 * | 3/2004 | Nascimben | 269/21 |
| 6,755,724 B1 * | 6/2004 | Shin et al. | 451/64 |
| 2001/0021000 A1 | 9/2001 | Egami | |

FOREIGN PATENT DOCUMENTS

| | | |
|---|---|---|
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 05-154923 | 6/1993 |
| JP | 05185360 A * | 7/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 06-235925 | 8/1994 |
| JP | 06265915 | 9/1994 |
| JP | 06-313870 | 11/1994 |
| JP | 07-084268 | 3/1995 |
| JP | 07128674 | 5/1995 |
| JP | 07181507 | 7/1995 |
| JP | 08095066 | 4/1996 |
| JP | 08-101395 | 4/1996 |
| JP | 08106101 | 4/1996 |
| JP | 08171094 | 7/1996 |
| JP | 08190099 | 7/1996 |
| JP | 08240807 | 9/1996 |
| JP | 08323597 A * | 12/1996 |
| JP | 09005762 | 1/1997 |
| JP | 09026578 | 1/1997 |
| JP | 09-061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 1115647 A * | 6/1999 |
| JP | 11174477 | 7/1999 |
| JP | 11212045 | 8/1999 |
| JP | 11-248930 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-137235 | 5/2000 |
| JP | 3000-147528 | 5/2000 |
| JP | 2000-0035302 A1 | 6/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001117105 | 4/2001 |
| JP | 2001-117109 | 4/2001 |
| JP | 2001-133745 | 5/2001 |
| JP | 2001133794 | 5/2001 |
| JP | 2001-133799 | 5/2001 |
| JP | 2001142074 | 5/2001 |
| JP | 2001147437 | 5/2001 |
| JP | 2001154211 | 6/2001 |
| JP | 2001-166272 | 6/2001 |
| JP | 2001-166310 | 6/2001 |
| JP | 2001-183683 | 7/2001 |
| JP | 2001-209052 | 8/2001 |
| JP | 2001-209060 | 8/2001 |
| JP | 2001-222017 | 8/2001 |
| JP | 2001-235758 | 8/2001 |
| JP | 2001-215459 | 9/2001 |

| | | |
|---|---|---|
| JP | 2001255542 | 9/2001 |
| JP | 2001264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001330840 | 11/2001 |
| JP | 2001-356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002137154 A * | 5/2002 |
| JP | 2002080321 | 6/2002 |
| JP | 2002202512 | 7/2002 |
| JP | 2002202514 | 7/2002 |
| JP | 2002214626 | 7/2002 |
| JP | 2003025198 A * | 1/2003 |

* cited by examiner

GRINDING TABLE FOR LIQUID CRYSTAL DISPLAY PANEL AND GRINDER APPARATUS USING THE SAME

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

This application claims the benefit of Korean Patent Application No. 15127/2002 filed on Mar. 20, 2002, which is hereby incorporated by reference for all purposes as if fully set forth herein.

BACKGROUND OF THE INVENTION

1. Field of the Invention

The present invention relates to a grinding table apparatus for a liquid crystal display panel and a grinder apparatus using the same, and more particularly, to a grinding table apparatus for a liquid crystal display panel and a grinder apparatus using the same capable of adapting to various sizes of unit liquid crystal display panels for grinding edges of the unit liquid crystal display panels that result from cutting liquid crystal display panels fabricated on a large-sized mother substrate into the unit liquid crystal display panels.

2. Discussion of the Related Art

Generally, a liquid crystal display (LCD) panel is cut into a plurality of unit LCD panels to improve yield. For simultaneously producing LCD panels, a plurality of thin film transistors and color filters are formed on two different mother substrates, respectively. Thereafter, the two mother substrates are attached to each other.

Conventionally, cutting of the unit LCD panel is performed through the process of forming a scribing line on the surface of the mother substrate with a wheel having a hardness higher than glass and then breaking the mother substrate along the scribing line. The process for fabricating an LCD apparatus will be described with reference to the accompanied drawings.

FIG. 1 is a schematic cross-sectional view illustrating a first mother substrate including thin film transistor array substrates and a second mother substrate including color filter substrates. The first and second mother substrates are attached to each other, thereby forming a plurality of unit LCD panels.

With reference to FIG. 1, the unit LCD panels are formed so that one side of thin film transistor array substrate 1 extends beyond color filter substrate 2. This is because a gate pad unit (not shown) and a data pad unit (not shown) are formed in the margin area of the thin film transistor array substrates 1 that do not overlap the color filter substrates 2.

Therefore, the color filter substrates 2 formed on the second mother substrate 30 are spaced apart to allow for a dummy region 31 corresponding to the region where the thin film transistor array substrates 1 extend on the first mother substrate 20.

Also, the respective unit LCD panels are positioned to effectively utilize the first and second mother substrates 20 and 30. The area by which the unit LCD panels are spaced apart to allow for the dummy region 32 depends on the model of the liquid crystal display panel being produced.

The first mother substrate 20 where the thin film transistor array substrates 1 are included, and the second mother substrate 30 where the color filter substrates 2 are included, are attached to each other. Thereafter, the LCD panels are cut into individual panels. The dummy region 31, where the color filter substrates 2 of the second mother substrate 30 are formed, and the dummy region 32 for separating the unit LCD panels are simultaneously removed at this time.

After cutting the second mother substrate 30 into the unit LCD panels, a shorting line formed at the marginal portion of the thin film transistor array substrate 1 for intercepting static electricity is removed. In this process, a sharp corner of the unit LCD panel is ground. Static electricity may occur at the shorting line when a conductive film is formed on the thin film transistor array substrate 1. Also, by grinding the sharp corner of the LCD panel, pieces are not separated from the corner of the unit LCD panel by the external impact. Grinding also prevents an operator from being injured by the sharp corner of the unit LCD panel in the fabrication process.

FIG. 2 is a schematic plan view of the conventional unit LCD panel.

With reference to FIG. 2, a unit LCD panel 10 includes a picture display unit 13 in which liquid crystal cells are arranged in a matrix form, a gate pad unit 14 for connecting a plurality of gate lines GL1 to GLm of the picture display unit 13 to a gate driver integrated circuit (not shown), to which a gate signal is applied, and a data pad unit 15 for connecting a plurality of data lines DL1 to DLn of the picture display unit 13 to a data driver integrated circuit (not shown), to which the picture information is applied. The gate pad unit 14 and the data pad unit 15 are formed at the marginal portion of the thin film transistor array substrate 1 where both side edges extend relative to the color filter substrate 2.

At the region where the data lines DL1 to DLn and the gate lines GL1 to GLm vertically cross one another, a thin film transistor (not shown) for switching the liquid crystal cell is formed therein. A pixel electrode is formed to be connected to the thin film transistor for driving the liquid crystal cell. A passivation film (not shown) is formed on the entire surface to protect the data lines DL1 to DLn, the gate lines GL1 to GLm, the thin film transistors, and the electrodes.

Also, a shorting line (not shown) for electrically shorting out the conductive films is formed at the marginal portion of the thin film transistor array substrate 1, to remove static electricity which may be generated during formation of the data lines DL1 to DLn, the gate lines GL1 to GLm, and the various electrodes on the thin film transistor array substrate 1.

At the color filter substrate 2 of the picture display unit 13, a plurality of color filters (not shown) are coated and separated by cell regions with a black matrix. A common transparent electrode (not shown) corresponding to the pixel electrode is formed at the thin film transistor array substrate 1.

A cell gap (not shown) is formed between the thin film transistor array substrate 1 and the color filter substrate 2 so that the two substrates are spaced apart and face each other. The thin film transistor array substrate 1 and the color filter substrate 2 are attached by a seal (not shown) formed at the exterior of the picture display unit, 13. A liquid crystal layer (not shown) is formed between the thin film transistor array substrate 1 and the color filter substrate 2.

A grinder apparatus for grinding each of the individually cut unit liquid crystal display panels 10 is explained in detail by referring to the attached drawing as follows.

FIG. 3 illustrates an exemplary diagram of a grinding table apparatus for a unit liquid crystal display panel and a grinder apparatus using the same according to a related art.

Referring to FIG. 3, a grinder apparatus according to a related art includes a loading unit 50 loading a cut unit liquid crystal display panel 10 thereon, a grinding unit 53 receiving the unit liquid crystal display panel 10 loaded on the loading unit 50 so as to arrange the received unit liquid crystal display panel 10 on a grinding table 51 and for grinding edges of the unit liquid crystal display panel 10 through a grind wheel 52 rotating at high speed, and an unloading unit 54 receiving the grinded unit liquid crystal display panel 10 from the grinding unit 53 so as to unload the received panel 10.

The grinding table 51 should be designed to have a size smaller than that of the unit liquid crystal display panel 10 to grind the edges of the unit liquid crystal display panel 10 obliquely as well as support the unit liquid crystal display panel 10 effectively. Compared to the edges of the grinding table 51, the edges of the unit liquid crystal display panel 10 extend beyond those of the grinding table 51.

FIGS. 4A to 4C illustrate exemplary diagrams of grinding tables in accordance with a variable size of a unit liquid crystal display panel according to a related art.

Referring to FIG. 4A, a grinding table 60 has a size somewhat smaller than that of a unit liquid crystal display panel 10 so that edges of the unit liquid crystal display panel 10 protrude slightly.

However, referring to FIGS. 4B and 4C, when sizes of unit liquid crystal display panels 70 and 80 are greater than that of the unit liquid crystal display panel 10 in FIG. 4A, the grinding table 60 in FIG. 4A fails to support the unit liquid crystal display panel 70 stably. On the contrary, when the size of the unit liquid crystal display panel 80 is smaller than that in FIG. 4A, edges of the liquid crystal display panel 80 do not protrude sufficiently from those of the grinding table 60 in FIG. 4A to allow for proper grinding.

In order to grind the unit liquid crystal display panel 70 in FIG. 4B, the grinding table 60 in FIG. 4A is removed from a production line and a large-sized grinding table 71 is installed at the production line. Likewise, in order to grind the unit liquid crystal display panel 80 in FIG. 4C, the grinding table 60 in FIG. 4A is removed from the production line to install a new grinding table 81 having a smaller size at the production line again.

Unfortunately, the grinding table according to the related art involves a tedious job of replacing the previously used grinding table with the new grinding table having a size corresponding to that of a liquid crystal display panel when the size of the liquid crystal display panel is changed. Such process reduces productivity due to a delayed process time.

Moreover, according to the related art, a plurality of grinding tables must be prepared to correspond to various sizes of liquid crystal display panels, thereby increasing its production cost, as well as requiring extra space to store the plurality of the grinding tables.

SUMMARY OF THE INVENTION

Accordingly, the present invention is directed to a grinding table apparatus for a liquid crystal display panel and a grinder apparatus using the same that substantially obviates one or more of the problems due to limitations and disadvantages of the related art.

An advantage of the present invention is to provide a grinding table apparatus for a liquid crystal display panel and a grinder apparatus using the same capable of receiving various sizes of unit liquid crystal display panels for grinding edges of the corresponding liquid crystal display panel after the liquid crystal display panels fabricated on a large-sized mother substrate are cut into individual unit liquid crystal display panels.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a grinding apparatus for a liquid crystal display panel according to the present invention includes a first grinding unit having a pair of first grinding tables, the first grinding unit for grinding a first edge of a unit liquid crystal display panel by a first grinding wheel; and a second grinding unit having a pair of second grinding tables, the second grinding unit for grinding a second edge of the unit liquid crystal display panel by a second grinding wheel.

In another aspect of the present invention, a grinding apparatus for a liquid crystal display panel comprising at least two movable grinding tables wherein the movable grinding tables are movable to correspond to a size of a unit liquid crystal display panel.

In another aspect of the present invention, a grinder apparatus for a liquid crystal display device includes a grinding unit having four moveable grinding tables and a grinding wheel for grinding an edge of the unit liquid crystal display panel.

In another aspect of the present invention, a grinding table apparatus for a liquid crystal display panel includes at least one fixed grinding table and at least one movable grinding table wherein the movable grinding table is movable in at least one of an x, a y, an x' and a y' direction to correspond to a size of a unit liquid crystal display panel.

The grinder table apparatus further may include a support table fixed at the center among the four grinding tables of the first grinding unit.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
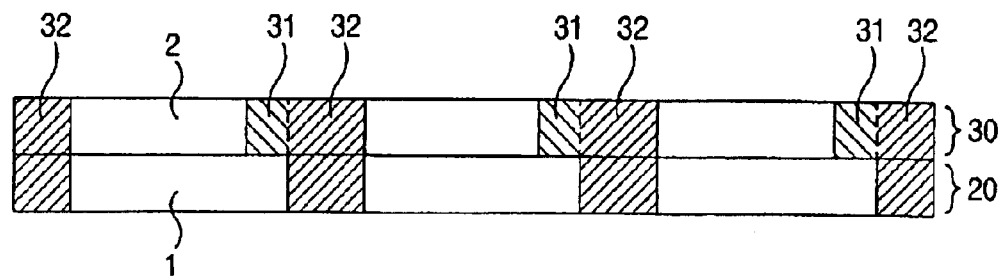
FIG. 1 is a schematic cross-sectional view illustrating a first mother substrate including thin film transistor array substrates and a second mother substrate including color filter substrates.
Figure 2:
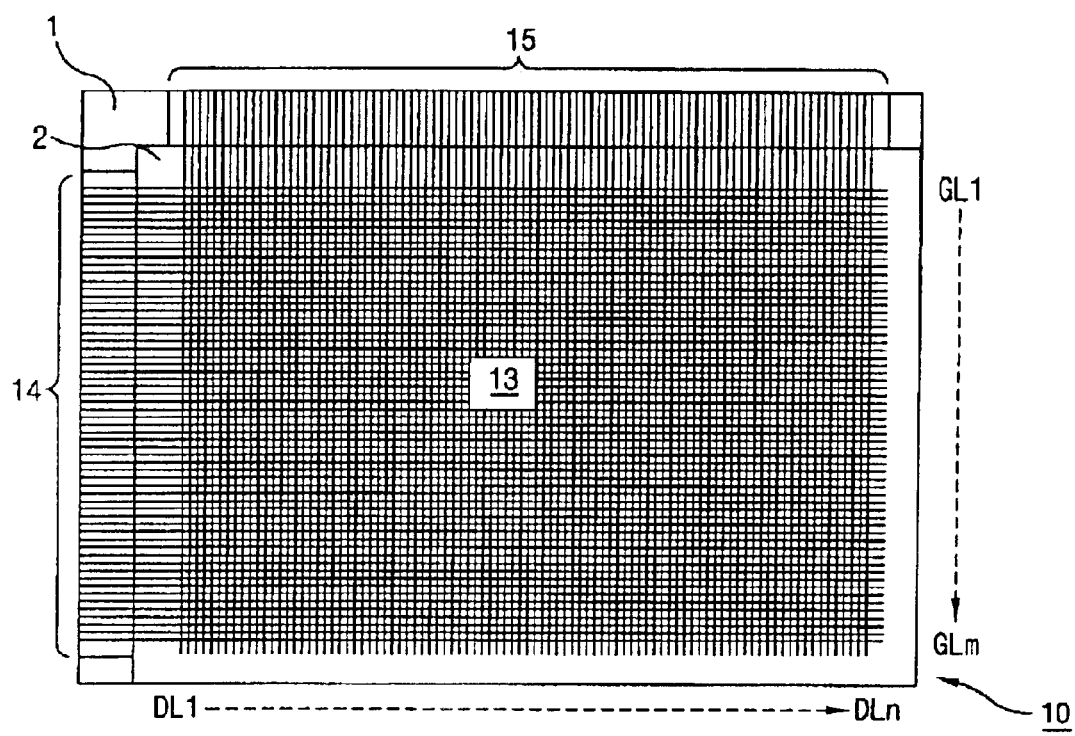
FIG. 2 illustrates a schematic layout of a unit liquid crystal display panel cut individually according to a related art.
Figure 3:
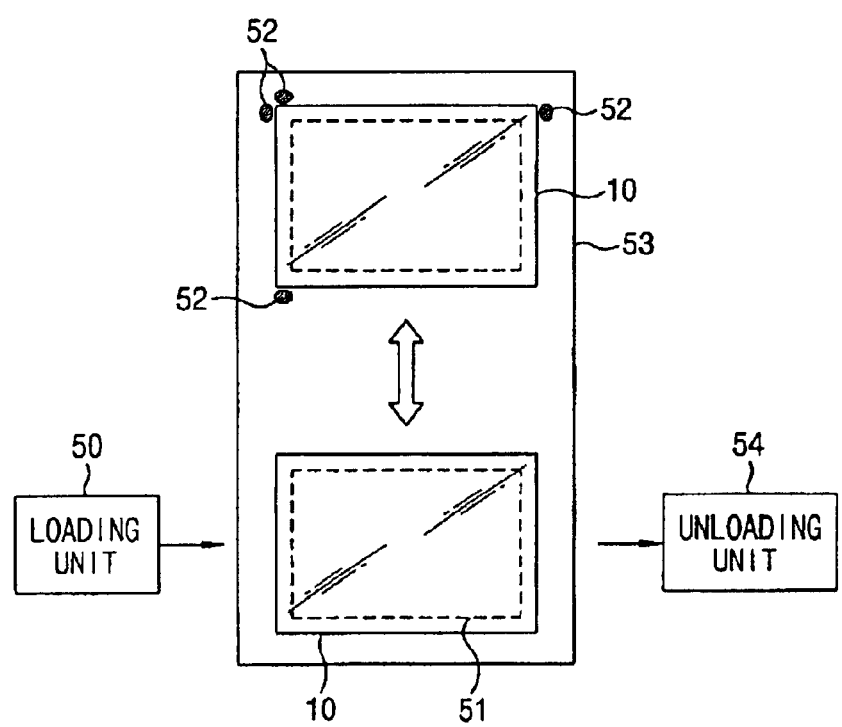
FIG. 3 illustrates an exemplary diagram of a grinding table for a unit liquid crystal display panel and a grinder apparatus using the same according to a related art.
Figure 4A:
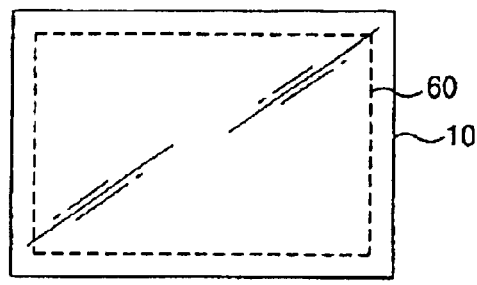
FIGS. 4A to 4C illustrate exemplary diagrams of grinding tables in accordance with a variable size of a unit liquid crystal display panel according to a related art.
Figure 4B:
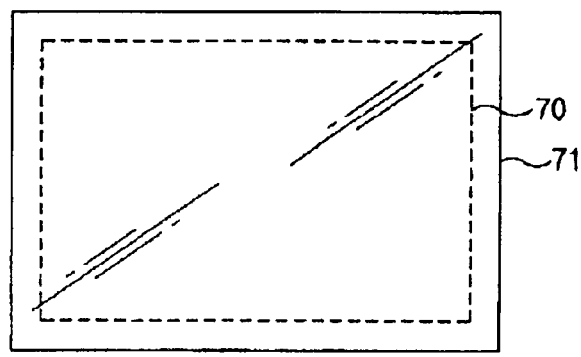
Figure 4C:
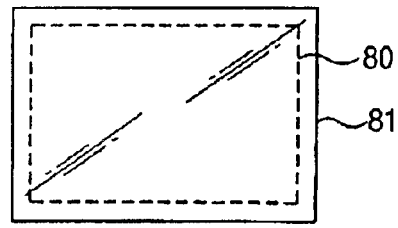
Figure 5:
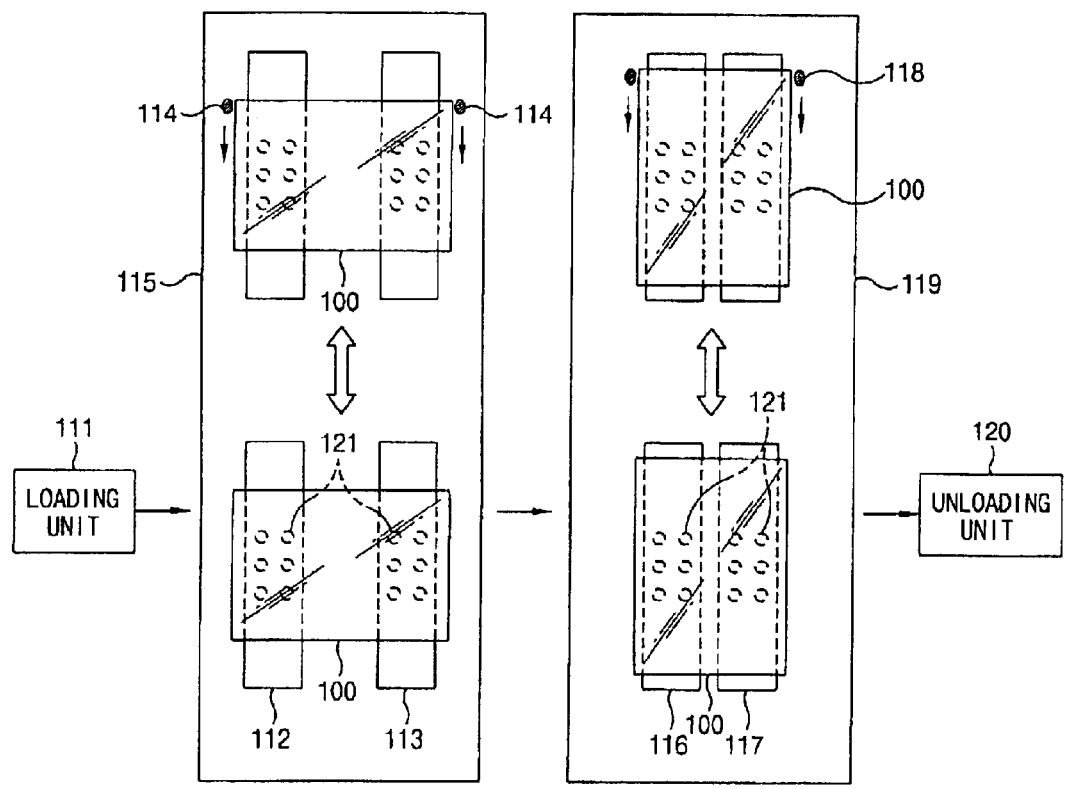
FIG. 5 illustrates a diagram of a grinding table apparatus for a liquid crystal display panel and a grinder apparatus using the same according to an embodiment of the present invention.

FIG. 5 illustrates a diagram of a grinding table apparatus for a liquid crystal display panel and a grinder apparatus using the same according to an embodiment of the present invention.

Referring to FIG. 5, a grinder apparatus for a liquid crystal display panel according to the present invention includes a loading unit 111 loading a unit liquid crystal display panel 100, a first grinding unit 115 having a pair of grinding tables 112 and 113 moving in a farther or closer direction to cope with a size of the unit liquid crystal display panel 100 to receive the unit liquid crystal display panel 100 loaded on the loading unit 111 by suction for adherence and grinding short edge sides of the unit liquid crystal display panel 100 through a first grind wheel 114, a second grinding unit 119 having another pair of grinding tables 116 and 117 moving in a farther or closer direction to receive and to hold the unit liquid crystal display panel 100, of which short edge sides have been ground, by suction for adherence and grinding long edge sides of the unit liquid crystal display panel 100 through a second grind wheel 118, and an unloading unit 120 for receiving the unit liquid crystal display panel 100 of which long edge sides have been ground by the second grinding unit 119.

In one embodiment, a plurality of suction holes 121 are formed at surfaces of the grinding tables 112, 113, 116, and 117 to make the unit liquid crystal display panel 100 adhere thereto by suction so as to support the liquid crystal display panel 100 stably. And, the grinder apparatus may further include a rotating unit enabling grinding of long sides of the unit liquid crystal display panel 100 by rotating the unit liquid crystal display panel, of which short sides have been ground, at 90°.

Figure 6A:
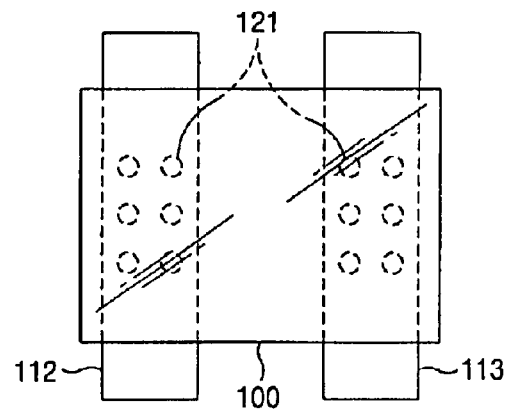
FIGS. 6A to 6C illustrate exemplary diagrams for grinding tables of a first grinding unit moving in a farther or closer direction reciprocally so as to cope with a size of a liquid crystal display panel in FIG. 5.
Figure 6B:
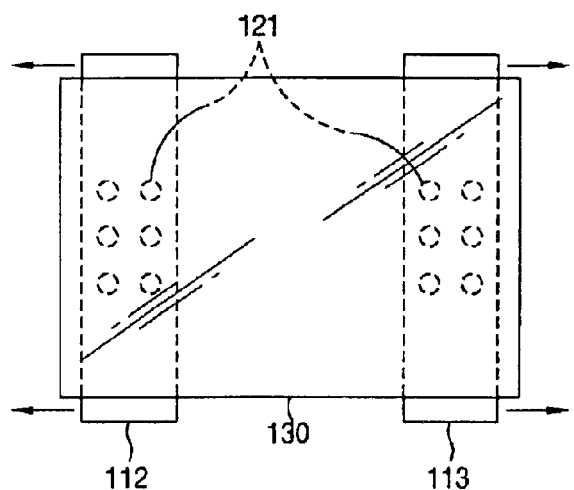
Figure 6C:
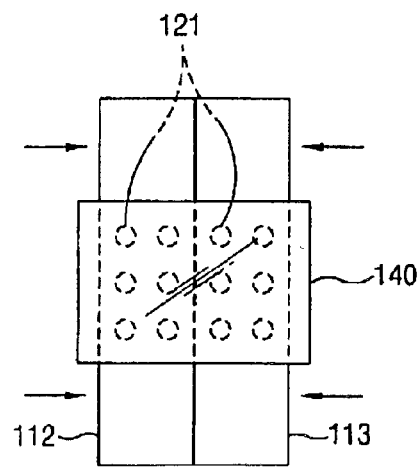

FIGS. 6A to 6C illustrate exemplary diagrams for grinding tables 112 and 113 of a first grinding unit 115 that is capable of moving in a farther or closer direction reciprocally so as to adapt with a size of a liquid crystal display panel 100 in FIG. 5.

Referring to FIG. 6A, a pair of the grinding tables 112 and 113 are spaced apart from each other by a predetermined distance so as to make short sides of the liquid crystal display panel 100 protrude from the corresponding edges of the tables 112 and 113. Thus, the grinding tables 112 and 113 support the liquid crystal display panel 100 so that short edge sides of the unit liquid crystal display panel 100 can be ground.

Referring to FIG. 6B, when a size of a unit liquid crystal display panel 130 is greater than that of the liquid crystal display panel 100 in FIG. 6A, the pair of the grinding tables 112 and 113 are displaced by a predetermined distance to move the grinding tables 112 and 113 farther from each other, i.e. in opposition directions, so as to make edges of a first side, e.g., a short side, of the unit liquid crystal display panel 130 protrude sufficiently over the edges of the grinding tables for grinding. Thus, the tables 112 and 113 support the unit liquid crystal display panel 130 so that short side edges of the unit liquid crystal display panel 130 can be ground.

Referring to FIG. 6C, when a size of a unit liquid crystal display panel 140 is smaller than that of the liquid crystal display panel 100 in FIG. 6A, the pair of the grinding tables 112 and 113 are displaced by a predetermined distance to move the grinding tables 112 and 113 closer to each other, i.e. an inward direction, so as to make edges of a first side, e.g., a short side, of the unit liquid crystal display panel 140 protrude sufficiently over the edges of the grinding table for grinding. Thus, the tables 112 and 113 support the unit liquid crystal display panel 140 so that first side edges of the unit liquid crystal display panel 140 can be ground.

The grinding tables 112 and 113 installed at the first grinding unit 115 are preferably prepared to move to adhere closely to each other to cope with a minimum-sized model as well as move to be spaced apart with a maximum interval in a farther direction to cope with a maximum-sized model. Such relative movement can be achieved by keeping one of the grinding tables 112 and 113 fixed relative to the other while moving the other grinding table appropriately.

The other grinding tables 116 and 117 installed at the second grinding unit 119 are preferably prepared to be displaced in order to cope with the various sizes of the unit liquid crystal display panels 100, 130, and 140 like the grinding tables 112 and 113 installed at the first grinding unit 115.

Similarly, such relative movement can be achieved by keeping one of the grinding tables 116 and 117 fixed relative to the other while moving the other table appropriately.

Moreover, suction holes 121 may be formed at surfaces of the grinding tables 112, 113, 116, and 117 of the first and second grinding units 115 and 119, respectively, so as to support each of the variously-sized unit liquid crystal display panels 100, 130, and 140 stably by making them adhere thereto by suction.

Therefore, the grinding table apparatus for the liquid crystal display panel and the grinder apparatus using the same are able to adapt with various sizes of the unit liquid crystal display panels without replacing the grinding table with a corresponding one.

Figure 7:
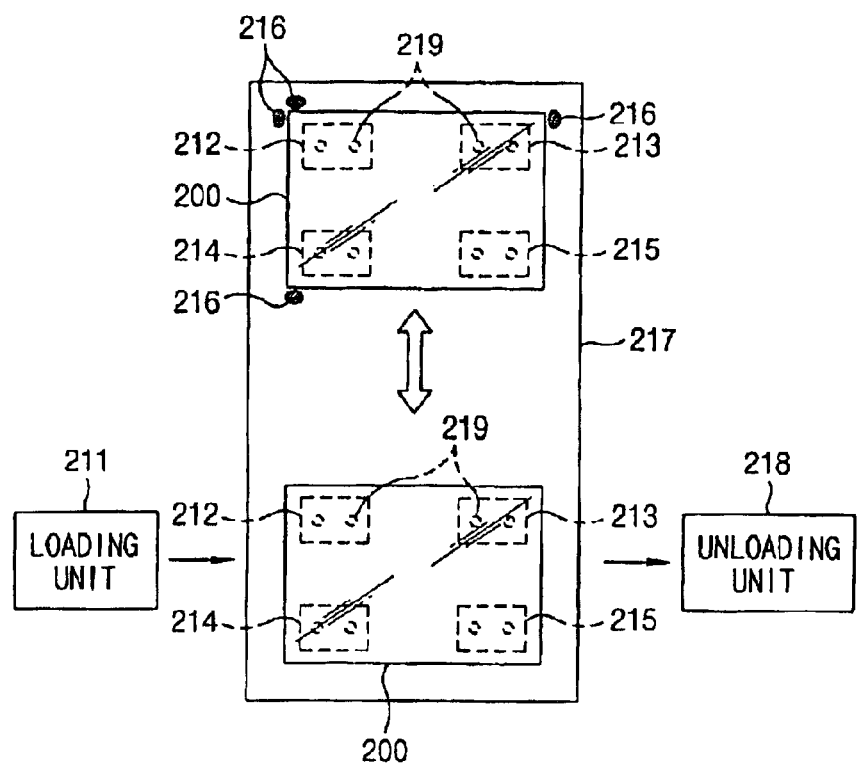
FIG. 7 illustrates a diagram of a grinding table apparatus for a liquid crystal display panel and a grinder apparatus using the same according to another embodiment of the present invention.

FIG. 7 illustrates a diagram of a grinding table apparatus for a liquid crystal display panel and a grinder apparatus using the same according to another embodiment of the present invention.

Referring to FIG. 7, a grinder apparatus according to the present invention includes a loading unit 211 for loading a liquid crystal display panel 200 thereon, a first grinding unit 217 having four grinding tables 212 to 215 capable of moving in farther or closer directions to adapt with a size of the unit liquid crystal display panel 200 to receive the unit liquid crystal display panel 200 loaded on the loading unit 211 by suction for adherence and for grinding edges of the unit liquid crystal display panel 200 through a first grind wheel 216 and an unloading unit 218 for receiving the unit liquid crystal display panel 200 of which edges have been ground.

A plurality of suction holes 219 may be formed at surfaces of the grinding tables 212 to 215 to make the unit liquid crystal display panel 200 adhere thereto by suction to support the liquid crystal display panel 200 stably.

Figure 8A:
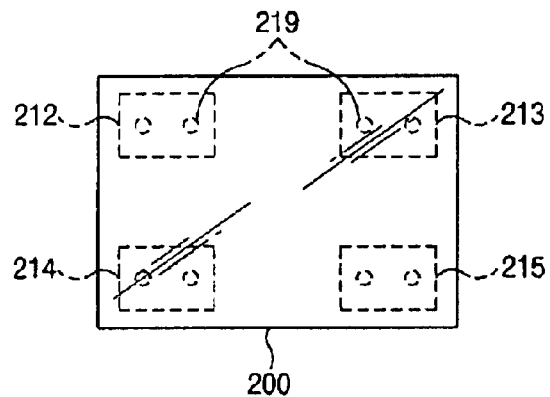
FIGS. 8A to 8C illustrate exemplary diagrams for grinding tables of a first grinding unit moving in farther or closer directions reciprocally so as to cope with a size of a liquid crystal display panel in FIG. 7.
Figure 8B:
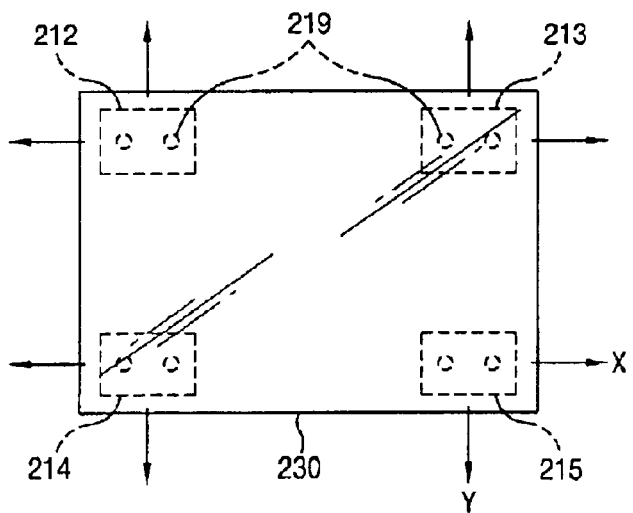
Figure 8C:
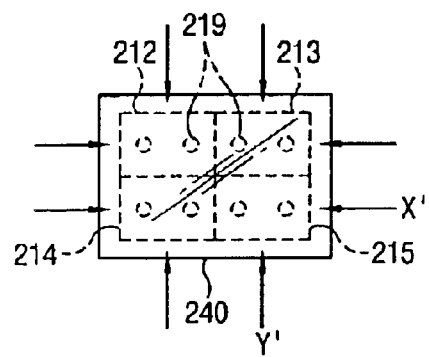

FIGS. 8A to 8C illustrate exemplary diagrams for the grinding tables 212 to 215 of the first grinding unit 217 moving farther or closer reciprocally to adapt with the size of the liquid crystal display panel 200 in FIG. 7.

Referring to FIG. 8A, the grinding tables 212 to 215 are spaced apart from each other by predetermined distances to make edges of the liquid crystal display panel 200 protrude from the corresponding edges of the tables sufficiently for grinding. Thus, the grinding tables 212 to 215 support the liquid crystal display panel 200 so that the edges of the unit liquid crystal display panel 200 can be ground.

Referring to FIG. 8B, when a size of a unit liquid crystal display panel 230 is greater than that of the liquid crystal display panel 200 in FIG. 8A, the grinding tables 212 to 215 are displaced by predetermined distances in an x or a y direction to move the grinding tables 212 to 215 farther from each other to make edges of the unit liquid crystal display panel 230 protrude somewhat over edges of the grinding tables. Thus, the tables 212 to 215 support the unit liquid crystal display panel 230 so that the edges of the unit liquid crystal display panel 230 of which size is greater than that of the unit liquid crystal display panel 200 in FIG. 8A can be ground.

Referring to FIG. 8C, when a size of a unit liquid crystal display panel 240 is smaller than that of the liquid crystal display panel 200 in FIG. 8A, the grinding tables 212 to 215 are displaced by predetermined distances in an x' or a y' direction to move the grinding tables 212 to 215 closer to each other to make edges of the unit liquid crystal display panel 240 protrude somewhat over edges of the grinding tables. Thus, the grinding tables 212 to 215 support the unit liquid crystal display panel 240 so that the edges of the unit liquid crystal display panel 240 of which size is smaller than that of the one 200 in FIG. 8A can be ground.

The grinding tables 212 to 215 are preferably prepared so as to be close to each other to cope with a minimum-sized model, as well as to move to be spaced apart with a maximum interval to adapt to a maximum-sized model.

Moreover, suction holes 219 are preferably formed at surfaces of the grinding tables 212 to support each of the variously-sized unit liquid crystal display panels 200, 230, and 240 stably by making the panels adhere to the tables by suction.

Therefore, the grinding table apparatus for the liquid crystal display panel and the grinder apparatus using the same enable to cope with various sizes of the unit liquid crystal display panels without replacing the grinding table by the corresponding one, thereby allowing grinding of all the edges of the liquid crystal display panel simultaneously. Compared to the foregoing embodiment of the present invention having the first and second grinding units to grind the long and short sides of the liquid crystal display panel respectively and the rotating unit to turn the unit liquid crystal display panel at 90°, this embodiment of the present invention enables the grinding process to be carried out conveniently and rapidly.

Figure 9A:
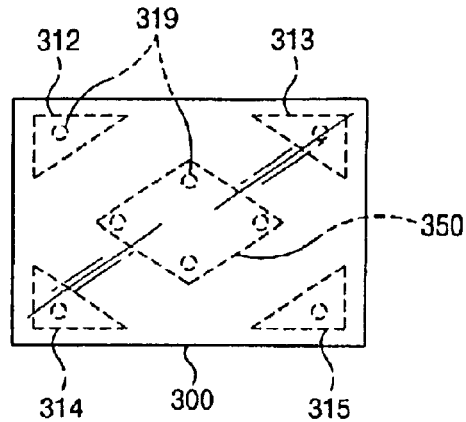
FIGS. 9A to 9C illustrate exemplary diagrams for grinding tables of a first grinding unit moving in farther or closer directions reciprocally so as to cope with a size of a liquid crystal display panel according to a further embodiment of the present invention.
Figure 9B:
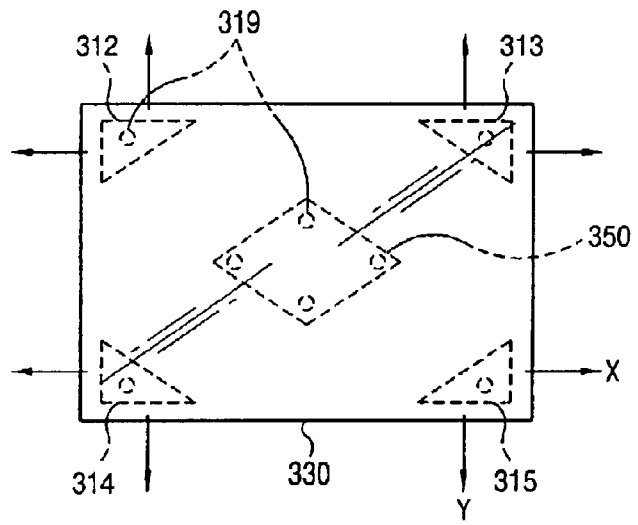
Figure 9C:
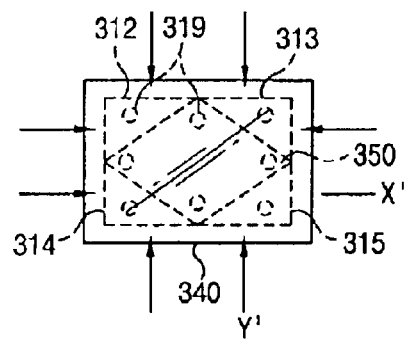

FIGS. 9A to 9C illustrate exemplary diagrams for grinding tables of a first grinding unit moving in farther or closer directions reciprocally to adapt with a size of a liquid crystal display panel according to a further embodiment of the present invention.

Referring to FIGS. 9A to 9C, four movable grinding tables 312 to 315 are displaced in farther or closer in an x, a y, an x' or a y' direction by predetermined distances to adapt for grinding edges of variously-sized unit liquid crystal display panels 300, 330, and 340, respectively.

Besides, the grinder apparatus according to this embodiment of the present invention further includes a support table 350 at a center of the four movable grinding tables 312 to 315. The support table 350 maybe fixed at the center of the moveable grinding tables 312 to 315.

The support table 350 supports each of the unit liquid crystal display panels 300, 330, and 340 at the center when the grinding tables 312 to 315 are displaced father away from each other, thereby preventing bending, drooping or warping of the corresponding unit liquid crystal display panel 300, 330, or 340.

Preferably, a plurality of suction holes 319 are formed at surfaces of the grinding tables 312 to 315 and support table 350 so as to support each of the variously-sized liquid crystal display panels 300, 330, and 340 stably.

Accordingly, the grinding table for the liquid crystal display panel and the grinder apparatus using the same moves at least two of its grinding tables in a farther or closer direction to cope with various sizes of unit liquid crystal display panels, thereby enabling grinding of the edges of the corresponding liquid crystal display panel.

And, the present invention eliminates the need to replace the grinding tables, thereby reduces process time and improves productivity.

Moreover, the present invention does not require a plurality of grinding tables to cope with the various sizes of the unit liquid crystal display panels. Thus investment costs are reduced and excessive space for storing the grinding tables is not required, which makes the grinding table apparatus and grinder apparatus according to the present invention advantageous in a practical use of space.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A grinder apparatus for a liquid crystal display panel, comprising:

a first grinding unit having a first grinding platform, the first grinding unit for grinding a first edge of a unit liquid crystal display panel by a first grinding wheel, the first grinding platform including a first fixed planar grinding support and a first movable planar grinding support; and a second grinding unit having a second grinding platform, the second grinding unit for grinding a second edge of the unit liquid crystal display panel by a second grinding wheel, the second grinding platform including a second fixed planar grinding support and a second movable planar grinding support.

2. The grinder apparatus of claim 1, further comprising a rotating unit for turning the unit liquid crystal display panel by 90° after grinding in the first grinding unit.

3. The grinder apparatus of claim 1, wherein at least one of the first and second movable planar grinding supports has a plurality of suction holes.

4. The grinder apparatus of claim 1, wherein the first edge is one of a long side edge and a short side edge of the unit liquid crystal display panel.

5. The grinder apparatus of claim 4, wherein the first grinding unit grinds the short edge of the unit liquid crystal display panel.

6. The grinder apparatus of claim 4, wherein the second grinding unit grinds the long edge of the unit liquid crystal display panel.

7. The grinder apparatus of claim 1, wherein the first side edge and the second side edge are substantially perpendicular.

8. A grinder apparatus for a liquid crystal display panel, comprising a grinding unit having four movable grinding supports and at least two grinding wheels for grinding at least two edges of the unit liquid crystal display panel along two non-parallel directions.

9. The grinder apparatus of claim 8, wherein at least one of the movable grinding supports has a plurality of suction holes.

10. The grinder apparatus of claim 8, further comprising a center planar support at a center of the grinding unit.

11. The grinder apparatus of claim 10, wherein the center planar support is fixed.

12. The grinder apparatus of claim 8, wherein the movable grinding supports are movable in at least one of an x, a y, an x' and a y' direction.

13. The grinder apparatus of claim 8, wherein the movable grinding supports are movable in both an x and a y or an x' and a y' direction.

14. A grinding table apparatus for a liquid crystal display panel, comprising:
at least two movable grinding supports, wherein the movable grinding supports are movable to correspond to a size of a unit liquid crystal display panel; and at least two grinding wheels arranged at edges of the unit liquid crystal display panel, wherein at least two of the grinding wheels are movable along two non-parallel directions.

15. The grinding table apparatus for a liquid crystal display panel of claim 14, comprising two movable grinding supports.

16. The grinding table apparatus for a liquid crystal display panel of claim 14, wherein a width between outer edges of the grinding supports at their closest position is less than a width of a unit liquid crystal display panel by a predetermined distance.

17. The grinding table apparatus for a liquid crystal display panel of claim 14, wherein at least one of the at least two movable grinding supports is movable along at least one of an x, a y, an x' and a y' direction.

18. The grinding table apparatus for a liquid crystal display panel of claim 14, comprising four movable grinding supports.

19. The grinding table apparatus for a liquid crystal display panel of claim 14, wherein a width between outer edges of the movable grinding supports at their closest position is less than a width of the unit liquid crystal display panel by a first predetermined distance and a length between outer edges of the movable grinding supports at their closest position is less than a length of the unit liquid crystal display panel by a second predetermined distance.

20. The grinding table apparatus for a liquid crystal display panel of claim 19, wherein the first predetermined distance and the second predetermined distance are substantially the same.

21. The grinding table apparatus for a liquid crystal display panel of claim 14, further comprising a center support between the movable grinding supports.

22. The grinding table apparatus for a liquid crystal display panel of claim 21, wherein the center support is fixed.

23. The grinding table apparatus for a liquid crystal display panel of claim 14, wherein the at least one of the movable grinding supports has a plurality of suction holes.

24. A grinding table apparatus for a liquid crystal display panel comprising at least one fixed grinding support and at least one movable grinding support wherein the movable grinding support is movable in at least one of an x, a y, an x' and a y' direction to correspond to a size of a unit liquid crystal display panel, wherein the at least one fixed grinding support and the at least one moveable grinding support are laterally between at least two edges of the unit liquid crystal display panel.

25. The grinding table apparatus for a liquid crystal display panel of claim 24, wherein a width of the grinding support is less than a width of the unit liquid crystal display panel by a predetermined distance.

26. The grinding table apparatus for a liquid crystal display panel of claim 24, wherein the movable grinding support is movable in both an x and a y or an x' and a y' direction.

27. The grinding table apparatus for a liquid crystal display panel of claim 24, comprising four movable grinding supports.

28. The grinding table apparatus for a liquid crystal display panel of claim 27, wherein the at least one fixed grinding support is between the four movable grinding supports.

29. The grinding table apparatus for a liquid crystal display panel of claim 24, wherein the at least one fixed grinding support has a plurality of suction holes.

30. The grinding table apparatus for a liquid crystal display panel of claim 24, wherein the at least one of the movable grinding support has a plurality of suction holes.

31. A grinding table apparatus for a liquid crystal display panel, comprising:
at least four movable grinding supports, wherein the movable grinding supports are movable to correspond to a size of a unit liquid crystal display panel; and
a center support between the movable grinding supports, wherein the at least one fixed grinding support and the at least four moveable grinding supports are laterally surrounded by edges of the unit liquid crystal display panel.

32. The grinding table apparatus for a liquid crystal display panel of claim 31, comprising four movable grinding supports.

33. The grinding table apparatus for a liquid crystal display panel of claim 31, wherein at least one of the four movable grinding supports is movable along at least one of an x, a y, an x' and a y' direction.

34. The grinding table apparatus for a liquid crystal display panel of claim 31, wherein the center support is fixed.

35. The grinding table apparatus for a liquid crystal display panel of claim 31, wherein the at least one of the movable grinding supports has a plurality of suction holes.

36. A grinder apparatus for a liquid crystal display panel, comprising:
a first grinding unit having a first grinding platform, the first grinding unit for grinding a first edge of a unit liquid crystal display panel by a first grinding wheel, the first grinding platform including at least two first movable planar grinding supports; and a second grinding unit having a second grinding platform, the second grinding unit for grinding a second edge of the unit liquid crystal display panel by a second grinding wheel, the second grinding platform including at least two second movable planar grinding supports, wherein at least one of the first and second movable planar grinding supports includes a plurality of suction holes.

37. The grinder apparatus of claim 36, further comprising a rotating unit for turning the unit liquid crystal display panel by 90° after grinding in the first grinding unit.

38. The grinder apparatus of claim 36, wherein the first edge is one of a long side edge and a short side edge of the unit liquid crystal display panel.

39. The grinder apparatus of claim 38, wherein the first grinding unit grinds the short edge of the unit liquid crystal display panel.

40. The grinder apparatus of claim 38, wherein the second grinding unit grinds the long edge of the unit liquid crystal display panel.

41. The grinder apparatus of claim 36, wherein the first side edge and the second side edge are substantially perpendicular.

42. A grinding table apparatus for a liquid crystal display panel comprising:

at least four movable grinding supports wherein the movable grinding supports are movable to correspond to a size of a unit liquid crystal display panel and at least one of the movable grinding supports has a plurality of suction holes.

43. The grinding table apparatus for a liquid crystal display panel of claim 42, comprising four movable grinding supports.

44. The grinding table apparatus for a liquid crystal display panel of claim 42, wherein at least one of the movable grinding supports is movable along at least one of an x, a, y, an x' and y' direction.

45. The grinding table apparatus for a liquid crystal display panel of claim 42, further comprising a center support between the movable grinding supports.

46. The grinding table apparatus for a liquid crystal display panel of claim 45, wherein the center support is fixed.

47. A grinder apparatus for a liquid crystal display panel, comprising a grinding unit having four movable grinding supports and at least two grinding wheels for grinding an edge of the unit liquid crystal display panel, wherein the unit liquid crystal display panel is supported by the movable grinding supports and protrudes from the movable grinding supports.

48. The grinder apparatus of claim 47, wherein the grinding wheels grind the protruded edge of the unit liquid crystal display panel.

49. A grinding table apparatus for a liquid crystal display panel, comprising:

at least two movable grinding supports, wherein the at least two movable grinding supports are movable to correspond to a size of a unit liquid crystal display panel arranged thereon, wherein the unit liquid crystal display panel is supported by the movable grinding supports and protrudes from the movable grinding supports; and at least two grinding wheels arranged at the protruded edge of the unit liquid crystal panel to grind the protruded edge of the unit liquid crystal display panel.

* * * * *